(12) United States Patent
Sunday

(10) Patent No.: US 7,979,809 B2
(45) Date of Patent: Jul. 12, 2011

(54) GESTURED MOVEMENT OF OBJECT TO DISPLAY EDGE

(75) Inventor: Derek E. Sunday, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 701 days.

(21) Appl. No.: 11/747,836

(22) Filed: May 11, 2007

(65) Prior Publication Data

US 2008/0282202 A1 Nov. 13, 2008

(51) Int. Cl.
- G06F 3/033 (2006.01)
- G06F 3/048 (2006.01)
- G09G 5/00 (2006.01)
- G06K 9/00 (2006.01)
- G06K 9/34 (2006.01)

(52) U.S. Cl. ........ 715/863; 345/156; 345/173; 345/179; 345/180; 715/764; 715/766; 715/775; 715/798; 382/118; 382/173

(58) Field of Classification Search .................. 345/156, 345/173, 179, 180; 715/764, 766, 775, 798, 715/863; 382/118, 173
See application file for complete search history.

(56) References Cited

U.S. PATENT DOCUMENTS

| | | | |
|---|---|---|---|
| 5,548,705 A * | 8/1996 | Moran et al. ................... | 715/863 |
| 5,586,244 A | 12/1996 | Berry et al. | |
| 5,784,061 A | 7/1998 | Moran et al. | |
| 5,838,326 A * | 11/1998 | Card et al. ..................... | 715/775 |
| 5,847,709 A * | 12/1998 | Card et al. ..................... | 715/850 |
| 6,054,989 A * | 4/2000 | Robertson et al. ........... | 715/848 |
| 6,088,032 A | 7/2000 | Mackinlay | |
| 7,015,910 B2 * | 3/2006 | Card et al. ..................... | 345/427 |
| 7,386,801 B1 * | 6/2008 | Horvitz et al. ................. | 715/764 |
| 2001/0026633 A1 * | 10/2001 | Abdel-Mottaleb et al. ... | 382/118 |
| 2004/0212617 A1 | 10/2004 | Fitzmaurice et al. | |
| 2005/0030255 A1 | 2/2005 | Chiu et al. | |
| 2005/0052427 A1 | 3/2005 | Wu et al. | |
| 2005/0057524 A1 | 3/2005 | Hill et al. | |
| 2005/0275635 A1 * | 12/2005 | Dehlin et al. .................. | 345/173 |
| 2005/0275636 A1 * | 12/2005 | Dehlin et al. .................. | 345/173 |
| 2006/0055662 A1 | 3/2006 | Rimas-Ribikauskas et al. | |
| 2007/0008300 A1 | 1/2007 | Yang et al. | |
| 2007/0064004 A1 | 3/2007 | Bonner et al. | |
| 2008/0040692 A1 * | 2/2008 | Sunday et al. ................ | 715/863 |
| 2009/0307623 A1 * | 12/2009 | Agarawala et al. ........... | 715/765 |

OTHER PUBLICATIONS

Virtual Information Piles for Small Screen Devices; Qian Ying Wang, Tony Hsieh, Merideth Ringel Morris, Andreas Paepcke, CHI 2006, Apr. 22-27, 2006, Montreal, Quebec, Canada, p. 345-350 (Attached as Article 1).

Uta Hinrichs, Sheelagh Carpendale, Stacey D. Scott and Eric Pattison. Interface Currents: Supporting Fluent Collaboration on Tabletop Displays. In *Proceedings of the 5th Symposium on Smart Graphics*. Springer Verlag, pp. 185-197, 2005.

(Continued)

*Primary Examiner* — Steven P Sax
*Assistant Examiner* — Grant D Johnson
(74) *Attorney, Agent, or Firm* — Workman Nydegger

(57) ABSTRACT

The use of gestures to organize displayed objects on an interactive display. The gesture is used to move the displayed object to the edge of the interactive display so that the displayed object is only partially displayed after being moved. The size of the displayed object may be reduced and/or the displayed object may be rotated such that an identified portion of the displayed object remains in the display after moving. A gesture may also be used to move multiple displayed objects to the edge of the display.

15 Claims, 11 Drawing Sheets

OTHER PUBLICATIONS

Multi-User Piles Across Space; Qian Ying Wang, Tony Hsieh, Merideth Ringel Morris, Andreas Paepcke, Copyright Sep. 27, 2005.
Multi-User Piles Across Space; Qian Ying Wang, Tony Hsieh, Merideth Ringel Morris, Andreas Paepcke (Attached as Article 2), Sep. 27, 2005.
Interface Currents: Supporting Fluent Collaboration on Tabletop Displays, Uta Hinrichs, Sheelagh Carpencale, Stacy D. Scott, Eric Pattison (Attached as Article 3), 2005.

* cited by examiner

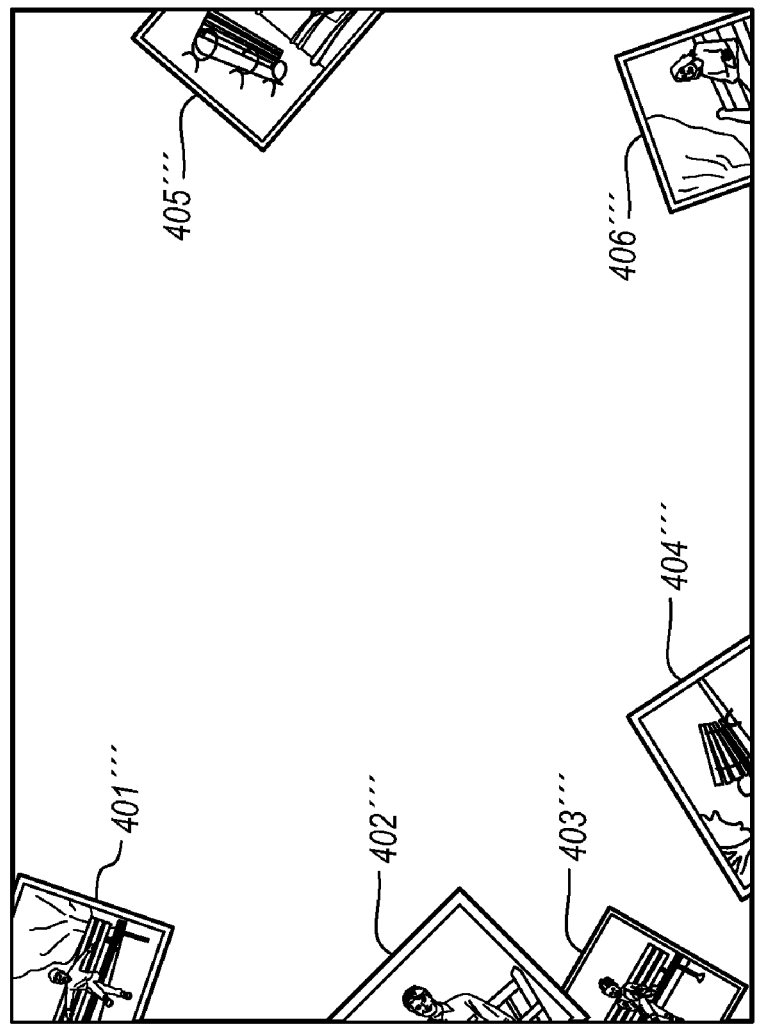

GESTURED MOVEMENT OF OBJECT TO DISPLAY EDGE

BACKGROUND OF THE INVENTION

The functionality of many computing systems and other devices relies on effective display of information using a display. More recently, the display has also been used in an interactive manner as a direct input device. For instance, the display might be a touch interface in which an object or finger might be placed in contact with the display to select an item on the display. Additionally, the user might input a gesture onto the display by moving the object in contact with the display in a desired manner. For example, to drag content on the display, the user might move the object from one portion of the display to another.

In a touch interface display, there is the potential at any given time for lots of content to be scattered throughout the display. Such content might include any type of content including, for example, music albums, photos, text windows, word documents, files, folders, or any other content. As the amount of content increases, there may become too much content on the display for the user to efficiently use and interact with such content. For instance, content may be stacked on top of other content such that desired content becomes partially or fully buried in the background underneath other foreground content.

If the buried content is desired, the user might maneuver the content that is displayed over the buried content, one item of content at a time, until the desired content is once again displayed in the foreground in the desired manner. If there is a great deal of content on the display, this maneuvering of content could take significant time.

BRIEF SUMMARY

Briefly summarized, embodiments described herein are directed to the use of gestures to organize displayed objects on an interactive display. The gesture is used to move the displayed object to the edge of the interactive display so that the displayed object is only partially displayed after being moved. In one embodiment, the size of the displayed object is also reduced. In one embodiment, alternatively or in addition, the displayed object may be rotated such that an identified portion of the displayed object remains in the display after moving. A gesture may also be used to move multiple displayed objects to the edge of the display.

The use of the gestures with the interactive display may allow for displayed objects to be moved out of the way and to the edge of the interactive display, thereby potentially exposing other content that had potentially been partially or fully covered by the moved displayed object.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of the present invention, a more particular description of the embodiments will be rendered by reference to the appended drawings. It is appreciated that these drawings depict only example embodiments and are therefore not to be considered limiting of the scope of the invention. The specific embodiments will be described and explained with additional specificity and detail through the use of the accompanying drawings in which:

FIG. 12 illustrates the user interface of FIG. 11 after the wave gesture is completed.

DETAILED DESCRIPTION OF THE PREFERRED EMBODIMENTS

Embodiments described herein relate to the use of gestures to manage displayed content on an interactive display. A computing system that incorporates an interactive display will first be described with respect to FIG. 1. Further embodiments will then be described with respect to FIGS. 2 through 12.

Figure 1:
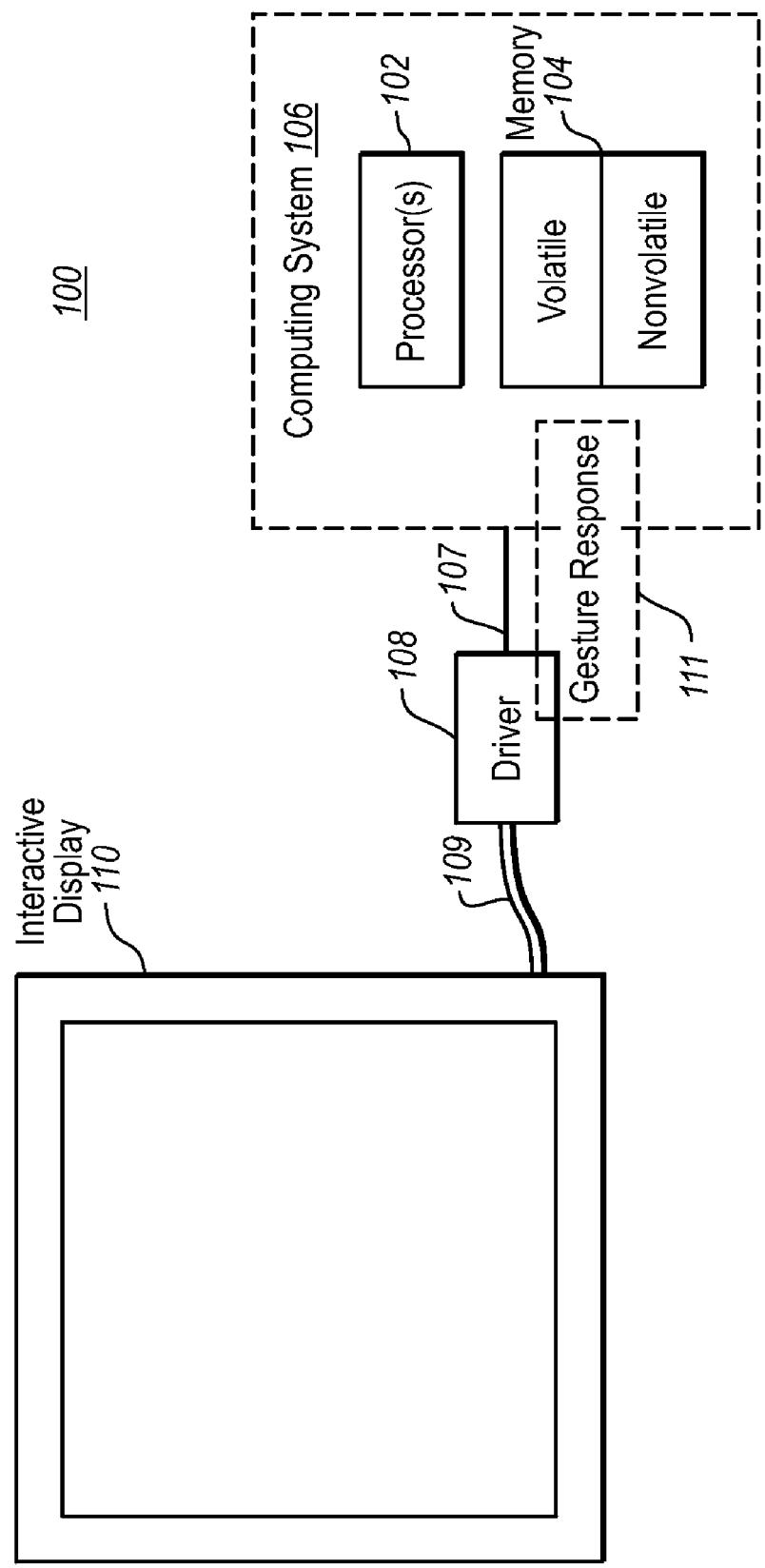
FIG. 1 illustrates a computing system in which embodiments described herein may operate.

FIG. 1 shows a schematic diagram of an example computing environment 100 in which embodiments described herein may be performed. The computing environment includes an interactive display 110, a computing system 106, and a driver 108. As will be described hereinafter, the computing system 106 may be any computing system that includes one or more processors 102 and some type of memory 104. The physical configuration of the interactive display 110 will sometimes depend on the specific physical configuration of the computing system 106. For instance, if the computing system 106 were quite small (say, for example, a PDA or a wristwatch), then the interactive display 110 might also be quite small, although that need not be the case. Similarly, if the computing system 106 were a desktop computer, the interactive display 110 might be larger. The principles of the present invention are not limited to the type of computing system 106, nor to the physical configuration of the interactive display 110.

The driver 108 receives display data from the computing system 106 over connection 107, transforms that data into suitable signals needed to display the corresponding image(s) on the interactive display 110. The driver 108 then sends the transformed signals to the interactive display 110 over connection 109.

Since the display 110 is interactive, the user (which might be a human being or another entity capable of interfacing with the display 110) might enter information into the interactive display 110. For instance, if the interactive display 110 were a touch sense display, a user might use a finger, stylus, or other mechanical instrument to contact the interactive display. Alternatively, the interactive display may incorporate image sensing technology in which objects in close proximity to the display may be imaged as input to the system. The interactive display 110 might also be able to detect laser pointers, or perhaps sense user eye or head position to receive the user input.

The driver 108 receives signals that represent system input from the interactive display 110 perhaps also over connection 109. The driver 108 may then transform those signals into data that may be used and processed by the computing system 106. The driver then sends that data to the computing system perhaps over connection 107.

The computing environment also includes a gesture response mechanism 111. The gesture response mechanism 111 is shown as being abstractly distributed between the driver 108 and the computing system 106. This is done to symbolically represent that some or all of the gesture recognition and response mechanisms described herein may be performed by the driver 108 itself, by the computing system 106, or partly by the driver 108 and partly by the computing system 106. As an alternative, the gesture response mechanism may be partially implemented within the hardware and/or software of the interactive display 110 itself.

The described computing system 106 is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

In its most basic configuration, a computing system 106 typically includes at least one processing unit 102 and memory 104. The memory 104 may be system memory, which may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage such as physical storage media. Such storage may be removable or non-removable, and may include (but is not limited to) PCMCIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 106 may also contain communication channels that allow the computing system 100 to communicate with other computing systems. Communication channels are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments consistent with the principles described herein also include computer-readable media for carrying or having computer-executable instructions or data structures stored thereon. Such computer-readable media can be any available media that can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices. Physical computer-readable media, however, do not include signals. The computer-readable media may also be any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 2:
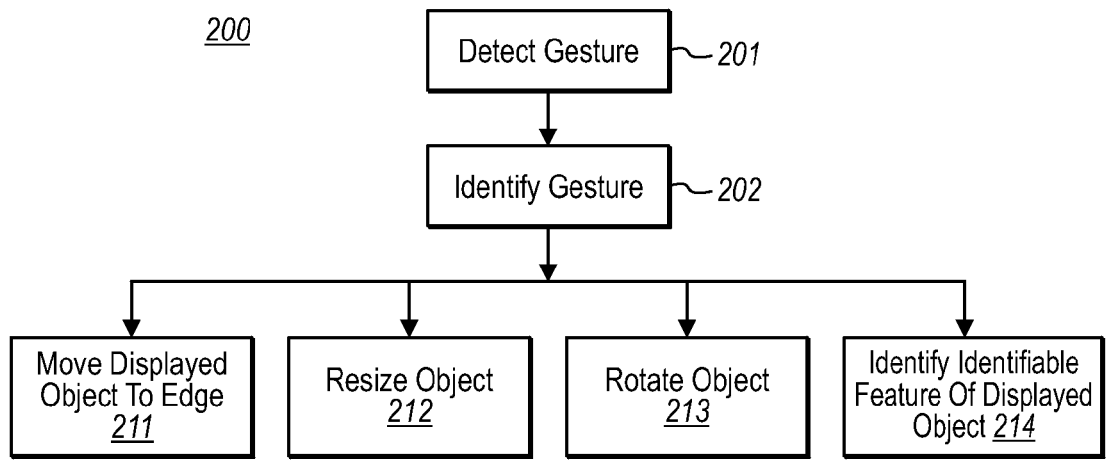
FIG. 2 illustrates a flowchart of a method for responding to a gesture to move objects towards the edge of a display, and to optionally also resize and rotate such objects.

As previously mentioned, the computing environment 100 of FIG. 1 includes a gesture response mechanism 111. Such a gesture response mechanism 111 may be implemented in hardware and/or software. FIG. 2 illustrates a flowchart of a method 200 that may be performed by the gesture response mechanism 111. The gesture response mechanism 111 may be configured to detect a single gesture, but may also be configured to detect different types of gestures, and control the display as appropriate in different ways depending on the gesture. The gesture response mechanism 111 may even be configured to detect multiple simultaneously-occurring gestures. The method 200 may be performed for each gesture detected at the interactive display 110.

Accordingly, the method 200 is initiated upon detecting that a gesture has been made on the interactive display (act 201). The gesture is then identified (act 202) depending on whether or not the gesture satisfies a set of one or more predetermined criteria.

For example, one gesture described herein will be referred to as a flick gesture. A flick gesture is detected when the input device (e.g., a finger, hand, stylus, laser pointer, etc.) is positioned at one portion of the display and then moved rapidly towards the edge of the display. The criteria for a flick gesture might include, for example, the length of time that the input device was relatively stationary prior to the flick movement, the relative speed of the input device during the period of being relatively stationary, the speed and direction profile of the flick movement, the length of the flick movement, and the like. Of course, these criteria are just example criteria. In any case, one or more criteria be developed that are representative of a user intent to volitionally move the input device in one direction to thereby imply a user-intentioned flick. The one or more criteria may depend heavily on the type and size of interactive display, and on the type of input device. The criteria might also depend on cultural considerations, experimental user behavior data, and the nature of a displayed object underlying the input device.

Another type of gesture described herein will be referred to herein as a wave gesture. A wave gesture involves general the waving of the input device over at least a portion of the display. The criteria for identifying a wave gesture may also differ greatly depending on the nature of the interactive display and input device, and on the culture and other contextual considerations in which the interactive display is being used.

Although the method 200 shows several acts 211 through 214 occurring upon identification of the gesture (act 202), the identity of the gesture may govern which acts are performed and for how many objects. The remainder of FIGS. 2 and 3 will be described in close conjunction with the description of FIGS. 4 through 12, which illustrate a variety of user interface scenarios in which embodiments of gesture response 111 may be implemented.

Figure 4:
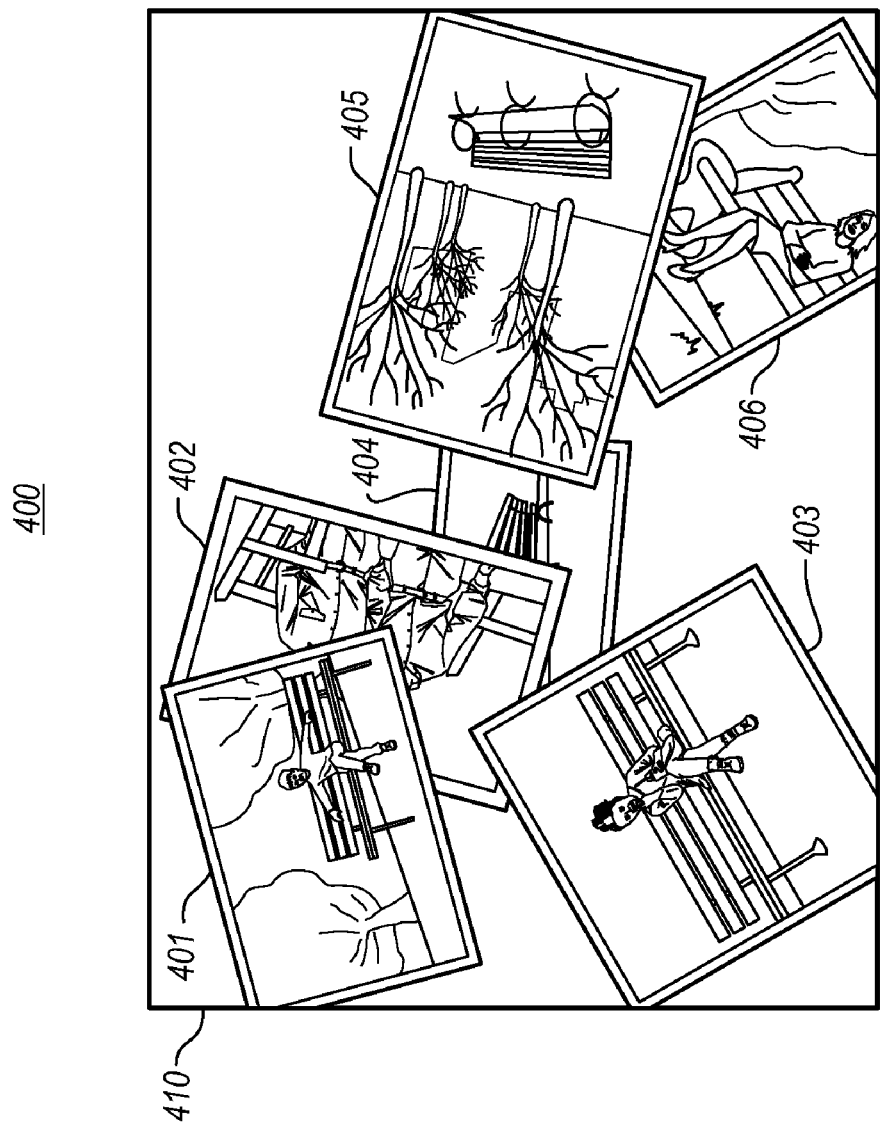
FIG. 4 illustrates a user interface example showing several displayed objects.

FIG. 4 illustrates an example user interface 400 that might be displayed on a particular interactive display (such as interactive display 111) at a particular point in time. In interactive displays, there is potential for lots of content to be scattered on in the interactive display at the same time. Such content may have various sizes and rotations, and may include any content. For example, the display objects might include digital photographs, music albums, songs, folders, files, word processing documents, other frames, or "stack" of content. Content stacks generally include two or more displayed objects that are associated with each other so that they are moved together. For instance, if one constituent object in the stack of display objects is moved on the interactive display, the other constituent displayed objects also move. These content types are listed merely for purposes of example. The exact content on the interactive display might depend on the running applications, and on the history of user interaction with that interactive display. Accordingly, the principles of the present invention are not limited in any respect to the type of content which might become scattered on the interactive display.

Referring to FIG. 4, the user interface 400 is defined by display or interface edge 410 and includes displayed objects 401 through 406, which in this specific user interface example, are simply photographs. Since the display is interactive, the user may have the ability to drag and rotate the displayed objects.

Figure 5:
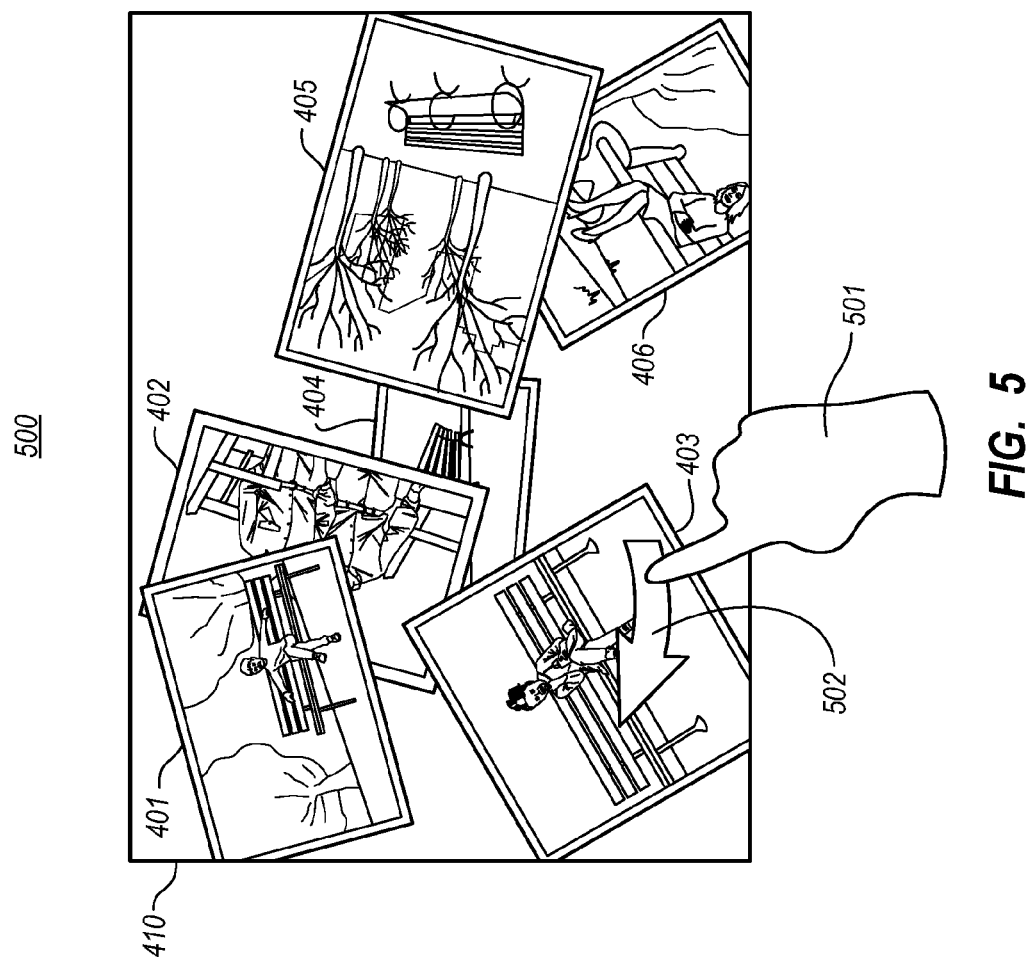
FIG. 5 illustrates the user interface of FIG. 4 being subjected to an input gesture.

FIG. 5 illustrates a user interface 500 which is the same as user interface 400 of FIG. 4, including displayed objects 401 through 406. However, in this case, an input device 501 (in the illustrated example, a finger) flicks the displayed object 403 in a particular direction represented by arrow 502. This flicking gesture may be distinguished from a drag gesture by the speed of movement of the flick. In this example, to make the user experience more intuitive, the object is moved in the general direction of the flick gesture.

Even though the flick gesture does not span the entire distance from its originating point to the edge of the display (and may be perhaps just a small fraction of that distance), the displayed object will be quickly moved to the edge of the interactive display. The user might experience much the same experience as flicking an object on a desk to the side. However, instead of the object falling off the desk, the object sticks to the edge of the desk surface.

Figure 6:
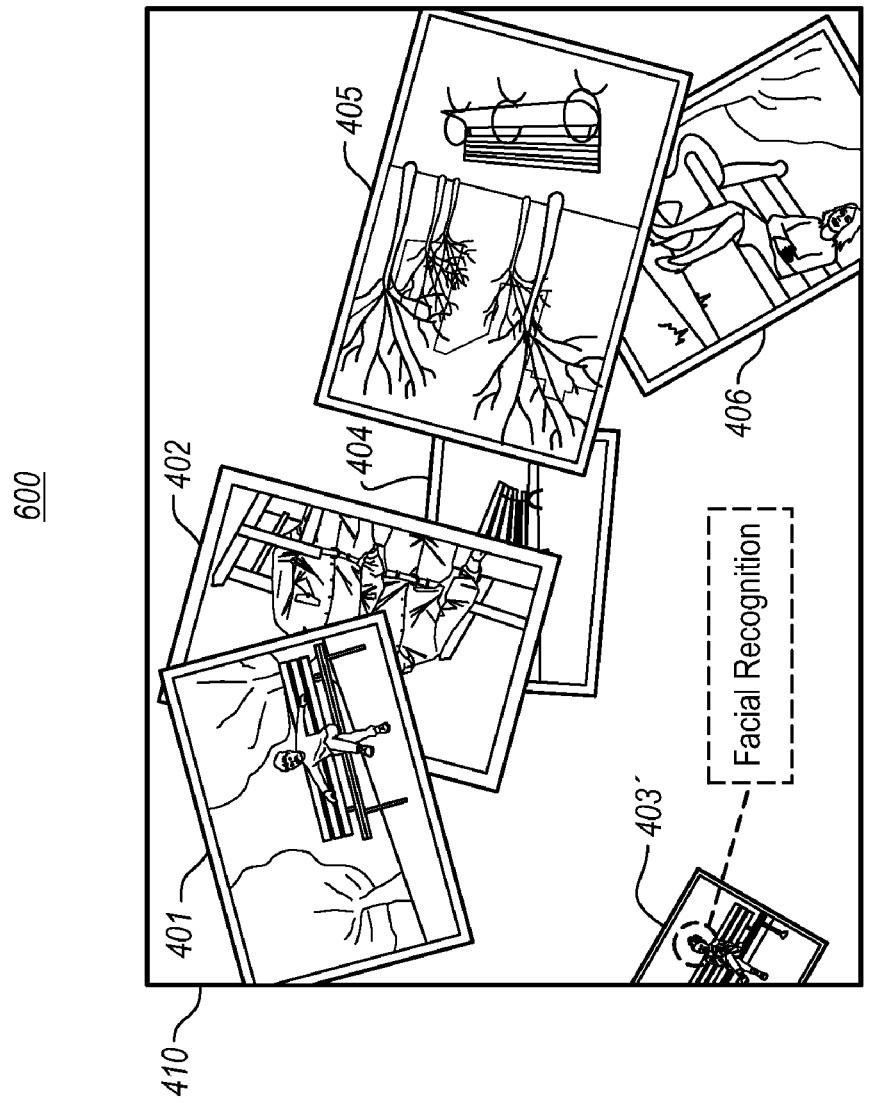
FIG. 6 illustrates the user interface of FIG. 5 after the flick gesture is completed and in which facial recognition is pointed out.

The result of the flick gesture may be seen in FIG. 6, which illustrates a user interface 600 that may be the same as user interface 500 of FIG. 5, except that the flicked object 403 is now moved to the edge of the user interface 600 in the form of modified displayed object 403'. Referring to FIG. 2, for example, once the gesture response mechanism identifies the gesture as a flick operation, the gesture response mechanism 111 might cause the displayed object to be moved to the edge of the interactive display so that only a portion of the displayed object is visible (act 211).

Although not required, in the example of FIG. 6, translational movement is not the only way that the displayed object 403 has been modified. In this example, the size of the displayed object has also changed (act 212 of FIG. 2). Specifically, the displayed object 403' is made smaller as compared to the displayed object 403 before the movement. Alternatively, the moved displayed object may be the same size or even larger than the displayed object before it was flicked to the edge. Whether resizing occurs, and the nature of such resizing, may depend on the nature of the interactive display and its usage, and perhaps on the nature of the displayed content itself. There is no requirement as to whether the resizing of the displayed objects occurs before, simultaneous with, or after the actual move operation.

Referring to FIG. 2, although not required, the modified object 403' may also be rotated (act 213 of FIG. 2) as compared to the displayed object 403 before movement. In this case, a portion of the displayed object is identified as a portion that is to remain displayed (act 214 of FIG. 2). This identified portion may have been identified well in advance of the moving operation. The object is then rotated such that after the displayed object is moved, the displayed object is rotated as compared to the orientation of the original displayed object prior to being moved (act 213). This rotation may occur in such a way that if there are portions to remain displayed as identified by act 214, then those portions remain displayed.

For instance, the gesture response mechanism 111 might include facial recognition technology that scans the displayed object to identify facial features. If there are such features, such features may then be identified as being portions of the display that remain displayed even after movement of the displayed object. For instance, a picture of a person might be rotated such that the person's face is still in view even after being moved to the edge of the display.

If there are not faces recognized on the displayed object, then perhaps the gesture response mechanism 111 may try to detect objects. For example, suppose there was a photograph of a park bench with no one in the picture. The park bench might be identified as a key feature to remain in view.

Color contrasting might also be used to determine what is to remain in view after movement. For example, suppose that the displayed object was an album object that was rendered to appear like an album cover that had two things on it, a black spider, and bright red lettering spelling out the name of the band. Both the black spider and band name are over a white background. The spider and/or the bright red band name might be selected to remain in view. Other criteria may be used and a fall back default rotation orientation may also be used.

Figure 7:
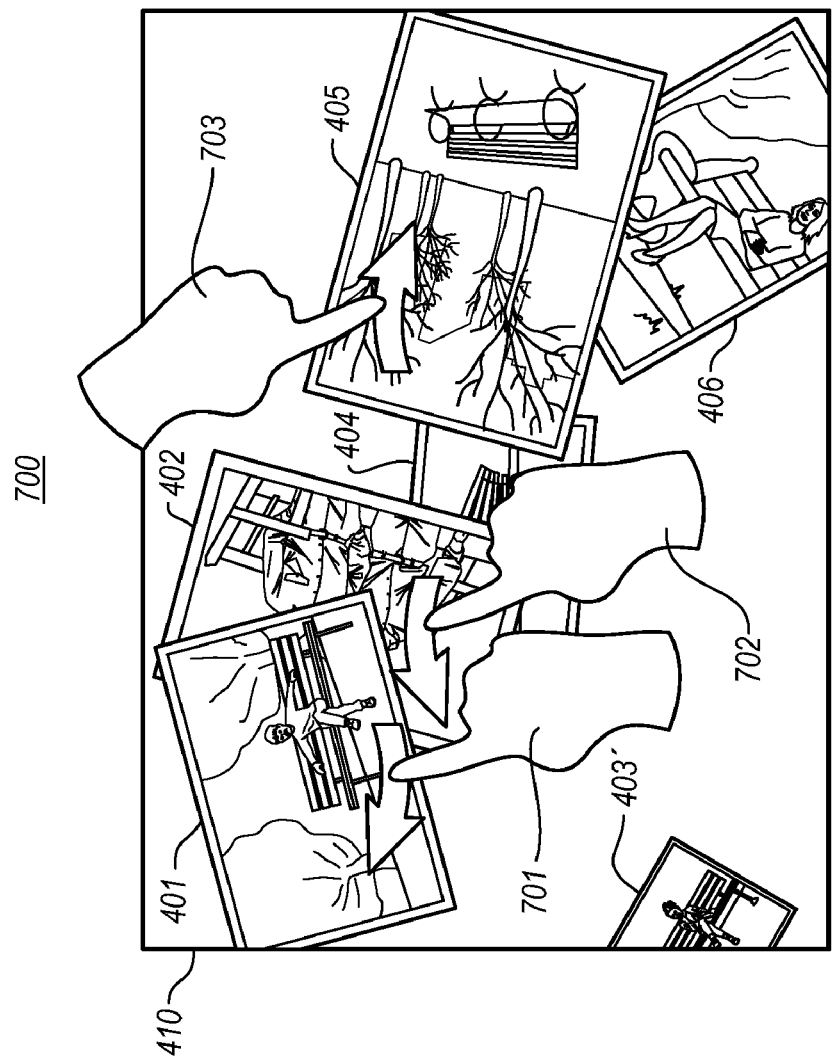
FIG. 7 illustrates the user interface of FIG. 6 being subjected to multiple simultaneous input gestures.

FIG. 7 illustrates a user interface 700, which is similar to the user interface 600 of FIG. 6, except that multiple simultaneous gestures are being received by the interactive display. Specifically, fingers 701, 702 and 703 are each flicking displayed objects 401, 402 and 405, respectively. Thus, in this case, there are three detected gestures, and the method 200 may be performed three times.

Figure 8:
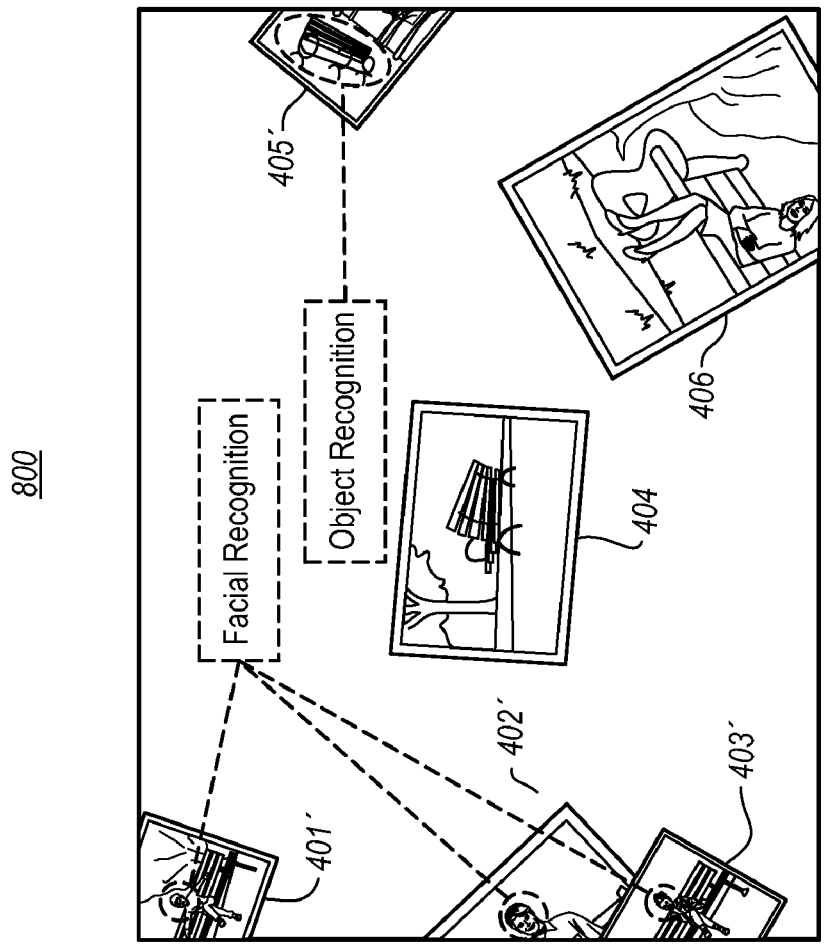
FIG. 8 illustrates the user interface of FIG. 7 after the input gestures of FIG. 7 are completed and in which facial and object recognition is pointed out.

Specifically, in the user interface 800 of FIG. 8, the displayed object 401 is moved to the edge of the interactive display, resized, and rotated to show an identifiable feature (in the case of displayed object 401, a face), thereby resulting in modified object 401'. The displayed object 402 is similarly moved, resized, and rotated to show an identifiable face resulting in modified object 402'. The displayed object 405 is moved, resized, and rotated to shown an identifiable object (e.g., a part bench) resulting in modified object 405'. Displayed objects 404 and 406 of FIG. 8 remain as they were in FIG. 4, being not affected by any of the flick gestures.

The logic used to identify what displayed objects are to be affected by the flick gesture may be different according to different embodiments. For instance, the flick gesture might be applied only to the displayed object that is in the foreground at the originating point of the flick gesture. On the other hand, the flick gesture might be applied to the foreground object, as well as one, some or all of the objects that are behind the foreground displayed object in the background. In other embodiments, the gesture response technology might switch between these two embodiments, depending on how much device input pressure is associated with the gesture, the speed of the flick gesture, and/or other parameters.

Figure 3:
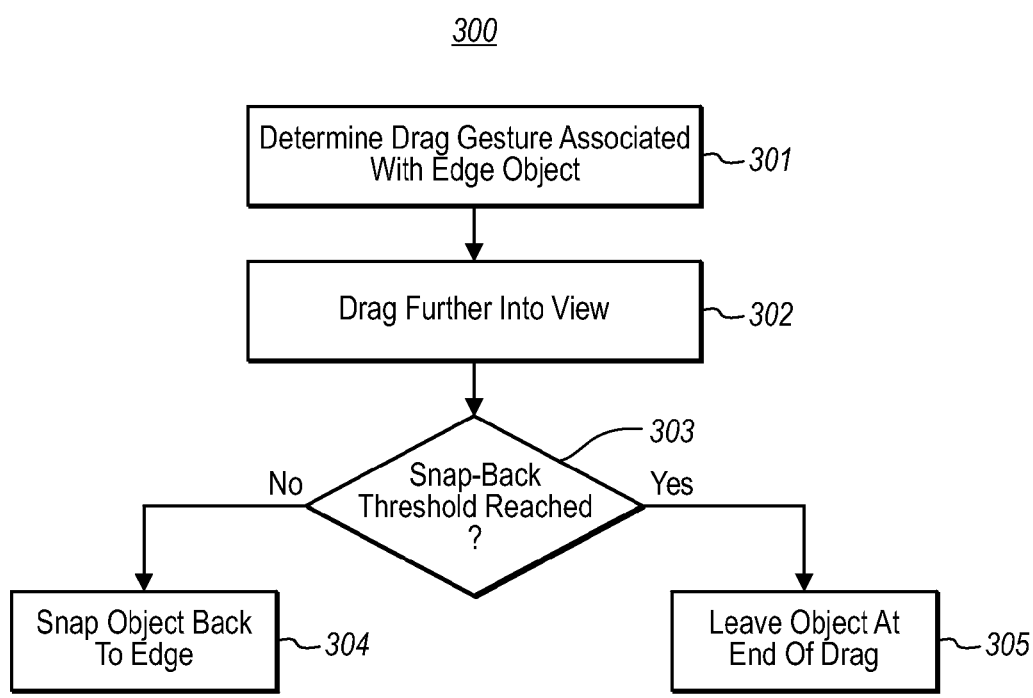
FIG. 3 illustrates a flowchart of a method for moving objects away from the edge of the interactive display.
Figure 9:
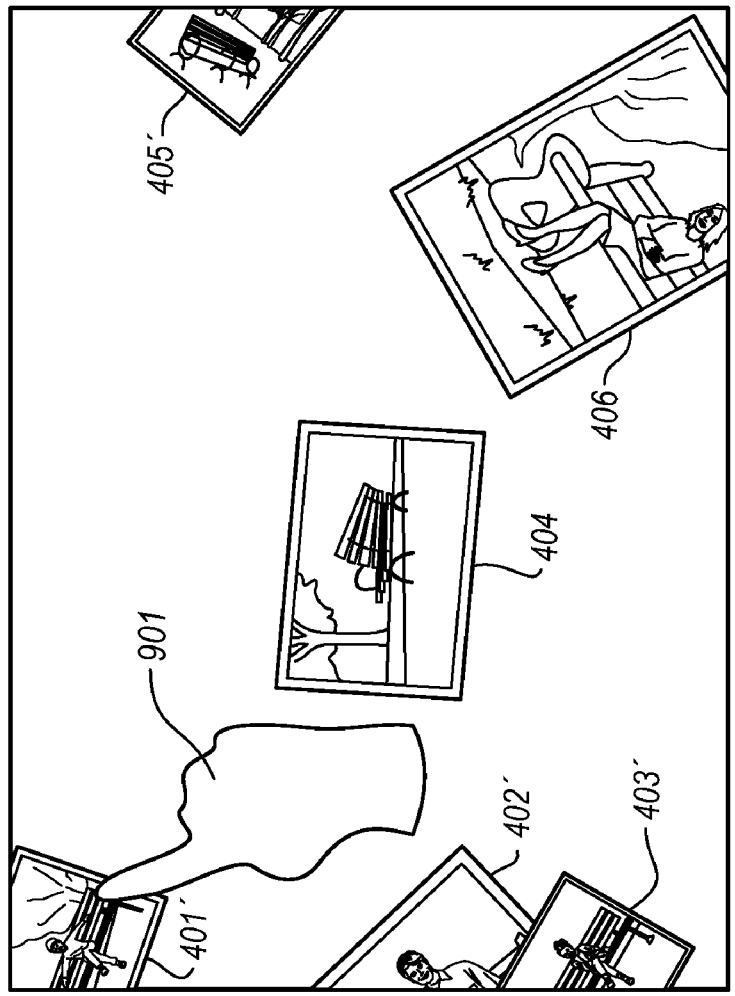
FIG. 9 illustrates the user interface of FIG. 8 in which one of the docked displayed objects is subjected to a user input to thereby move the docked object further into view.

FIG. 9 illustrates an optional interactive effect in which once an object is moved to the edge of the display, the object has a tendency to "stick" to the edge of the display. For instance, the user interface 900 is similar to the user interface 800 of FIG. 8, except that an input device (e.g., finger 901) is contact the interactive display at the position of the object 401'. That object 401' might be considered as "docked" to the edge of the display. FIG. 3 illustrates a method 300 for enforcing such docking and will be described with respect to FIGS. 9 and 10.

The method 300 of FIG. 3 determines that a second gesture is associated with the moved displayed object (act 301). For instance, by contacting the display at the position of the displayed object 401' at an originating point of a gesture, the gesture might be associated with that displayed object 401'.

Figure 10:
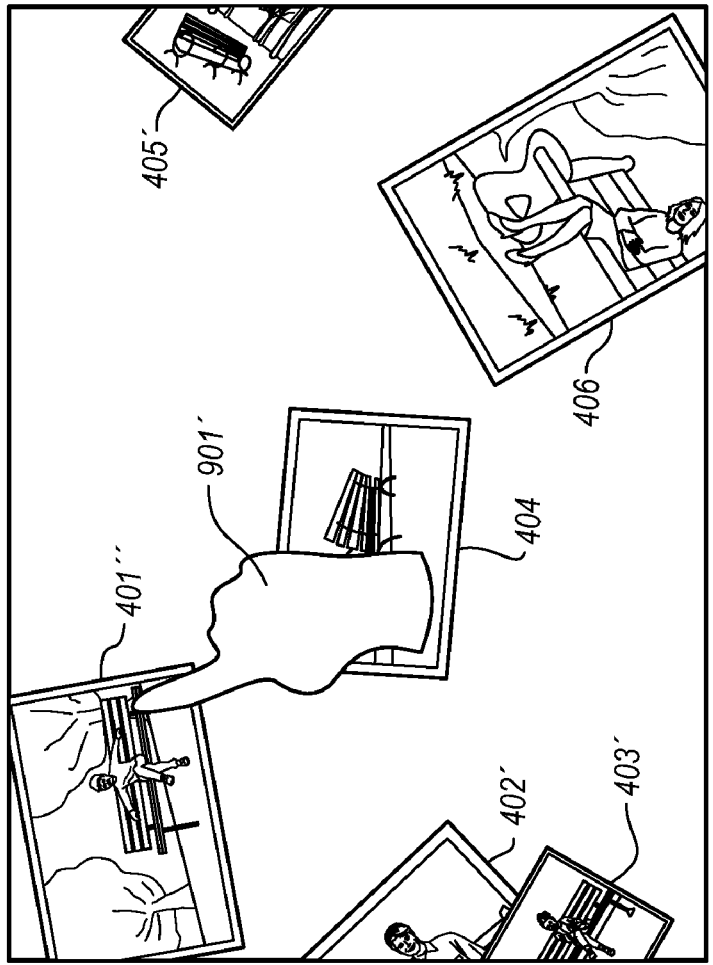
FIG. 10 illustrates the user interface of FIG. 9 in which the docked object is moved much further into view.

As apparent from the user interface 1000 of FIG. 10, the displayed object is then subjected to a dragging gesture, thereby dragging the displayed object further into view in a direction of the drag gesture (act 302) as represented by dragged object 401". While the displayed object is being dragged, the dragged object might also be rotated and resized. In one embodiment, the objects are rotated and resized towards the direction of their original rotation and size as existed before the object was moved to the edge of the display.

For H instance, object 401" of FIG. 10 is shown closer to the size and orientation of the object 401 of FIG. 4.

If, at the end of the dragging gesture, the displayed object has not reached a particular position in the display (no in decision block 303), then the object snaps back to its original position (act 404). For instance, if the displayed object 401' was dragged further into view, but was not completely still viewable, then the displayed object might snap back to its docked position at the edge of the display after completion of the drag operation. On the other hand, if the displayed object 401' is dragged to a particular spatial threshold in the display (Yes in decision block 303) (e.g., so as to be completely viewable, having a certain fraction viewable, or being at least a certain distance from the edge of the display), the drag gesture may be applied fully to the displayed object (act 305). Thus, the displayed object may be dragged away from the edge of the display, without snapping back to its docked position.

Figure 11:
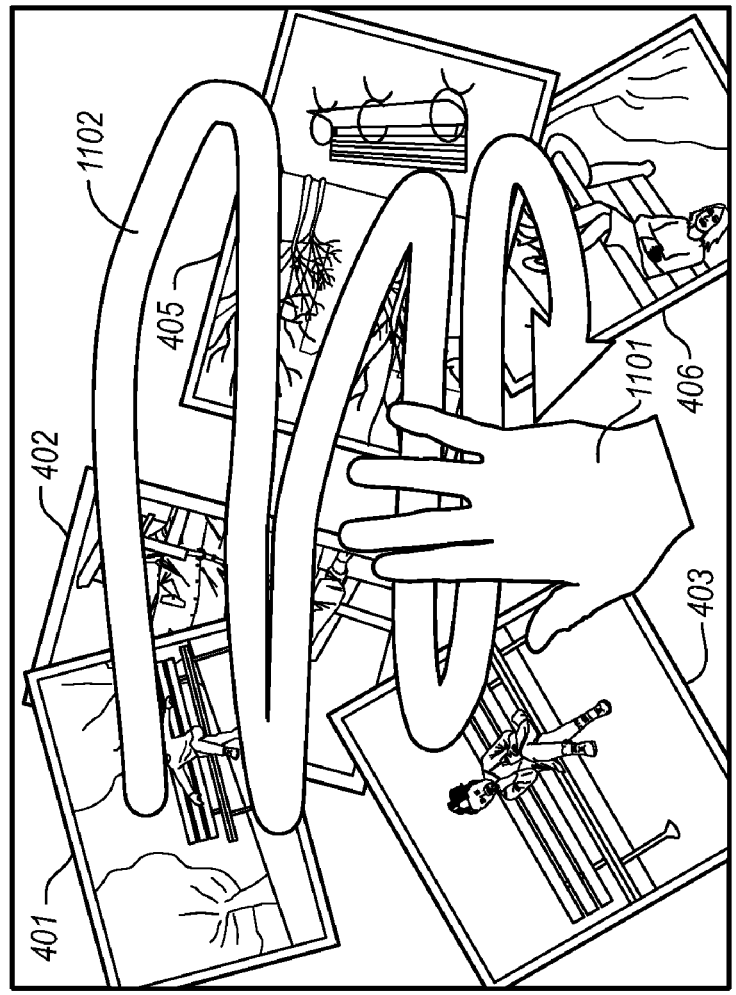
FIG. 11 illustrates the user interface of FIG. 4 being subjected to a wave gesture.

Flick gestures are not the only gesture that may be subjects of the method 200 of FIG. 2. FIG. 11 illustrates a user interface 1100 that is similar to the user interface 400 of FIG. 4, including displayed objects 401 through 406 in the same positions as compared between FIGS. 4 and 11. However, in the case of FIG. 11, an input device (e.g., hand or finger 1101) applies a gesture to the display. In this case, the gesture is a wave gesture.

The wave gesture includes two major segments, but in the illustrated case includes a larger number of back and forth motions. The method 200 would identify the gesture as a wave gesture, and would then move a number of objects on the display towards the edge. FIG. 12 illustrates a user interface 1200 that shows the result of the wave gesture of FIG. 11. In the illustrated case, the wave gesture spanned substantially the entire interactive display, and all displayed objects were moved to the edge of the display. The displayed objects were also resized, and rotated.

The wave gesture may also be used to move only some of the displayed objects towards the edge of the display. For instance, the display may be divided into portions. If a wave gesture is detected in that portion, all displayed objects in that portion might be moved to the edge. Alternatively, perhaps those displayed objects that are in the path of the wave gesture, or are within a certain distance of that path, are moved to the edge.

Although a flick gesture and a wave gesture have been described in detail herein, the principles of the present invention are not limited to the type of gesture being detected. Accordingly, embodiments described herein allow for an efficient and flexible mechanism for a user to manage scattered content on an interactive display.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A computer program product comprising one or more physical computer-readable media having stored thereon computer-executable instructions that, when executed by one or more processors of a computing system, cause the computing system to perform the following upon detecting that a flick gesture has been made on an interactive display associated with the computing system:

in response to detection of the flick gesture, an act of identifying a portion of a displayed object to keep in display, the identified portion being less than the whole object;

an act of moving the displayed object to the edge of the interactive display including rotating the displayed object so that only the identified portion of the displayed object is displayed at the edge of the interactive display after being moved as if the displayed object were extending past the edge of the interactive display;

in response to detection of the flick gesture, an act of changing a size of the portion of the displayed object such that at least after the displayed object is moved, the portion of the displayed object has changed size as compared to the size of the displayed object before the displayed object is moved;

upon detecting a second gesture that has been made on the interactive display, an act of determining that the second gesture is associated with the moved displayed object;

an act of dragging the displayed object further into view including rotating and resizing the displayed object towards the direction of its original rotation and size as existed before the displayed object was moved to the edge of the interactive display;

at the end of the act of dragging, an act of determining whether the displayed object has been dragged to a threshold position on the interactive display;

if the displayed object has been dragged at least to the threshold position, an act of positioning the displayed object at the location of the end of the act of dragging; and if the displayed object has not been dragged at least to the threshold position, an act of snapping the displayed object back to the edge of the interactive display.

2. A computer program product in accordance with claim 1, wherein the displayed object is moved to the edge in a direction that approximates a direction of the flick gesture.

3. A computer program product in accordance with claim 1, wherein the computer-executable instructions are further structured such that, when executed by the one or more processors, the computing system is further caused to perform the following upon detecting that a flick gesture has been made on an interactive display associated with the computing system:

an act of detecting that the flick gesture satisfies a set of one or more predetermined criteria.

4. A computer program product in accordance with claim 1, wherein the flick gesture is a first flick gesture, and wherein the computer-executable instructions are further structured such that, when executed by the one or more processors, the computing system is further caused to perform the following upon detecting a second flick gesture that is made on the interactive display:

in response to detection of the second flick gesture, an act of moving a second displayed object to the edge of the interactive display so that only a portion of the second displayed object is displayed at the edge of the interactive display after being moved as if the second displayed object were extending past the edge of the interactive display; and in response to detection of the second flick gesture, an act of changing a size of the portion of the second displayed object such that at least after the second displayed object is moved, the portion of the second displayed object has changed size as compared to the size of the second displayed object before the second displayed object is moved.

5. A computer program product in accordance with claim 4, wherein the first flick gesture and the second flick gesture are received by the interactive display at the same time.

6. The computer program product in accordance with claim 1, wherein the portion of the displayed object is identified using one of:

facial recognition technology that detects the portion of the displayed object that includes a face;

object detection that detects the portion of the displayed object that includes an object; or color contrasting that detects the portion of the displayed object that includes one or more colors.

7. A computer program product comprising one or more physical computer-readable media having stored thereon computer-executable instructions that, when executed by one or more processors of a computing system, cause the computing system to perform the following:

in response to detection of a flick gesture on an interactive display displaying a displayed object, an act of identifying a portion of the displayed object to keep in display, the identified portion being less than the whole object, wherein the portion is identified using facial recognition technology that detects the portion of the displayed object that includes a face;

an act of rotating and moving the displayed object to the edge of the interactive display so that only the identified portion of the displayed object is displayed at the edge of the interactive display after being moved as if the displayed object were extending past the edge of the interactive display;

upon detecting a second gesture that has been made on the interactive display, an act of determining that the second gesture is associated with the moved displayed object; and an act of dragging the displayed object further into view including rotating and resizing the displayed object towards the direction of its original rotation and size as existed before the displayed object was moved to the edge of the interactive display;

at the end of the act of dragging, an act of determining whether the displayed object has been dragged to a threshold position on the interactive display;

if the displayed object has been dragged at least to the threshold position, an act of positioning the displayed object at the location of the end of the act of dragging; and if the displayed object has not been dragged at least to the threshold position, an act of snapping the displayed object back to the edge of the interactive display.

8. The computer program product in accordance with claim 7, wherein the flick gesture is a first flick gesture, and wherein the computer-executable instructions are further structured such that, when executed by the one or more processors, the computing system is further caused to perform the following upon detecting a second flick gesture that is made on the interactive display:

in response to detection of the second flick gesture, an act of moving a second displayed object to the edge of the interactive display so that only a portion of the second displayed object is displayed at the edge of the interactive display after being moved as if the second displayed object were extending past the edge of the interactive display; and in response to detection of the second flick gesture, an act of changing a size of the portion of the second displayed object such that at least after the second displayed object is moved, the portion of the second displayed object has changed size as compared to the size of the second displayed object before the second displayed object is moved.

9. A computer program product in accordance with claim 7, wherein the displayed object is moved to the edge in a direction that approximates a direction of the flick gesture.

10. The computer program product in accordance with claim 7, wherein the computer-executable instructions are further structured such that, when executed by the one or more processors, the computing system is further caused to perform the following upon detecting a wave gesture that is made on the interactive display:

in response to detection of the wave gesture, an act of moving a plurality of displayed objects to positions at the edge of the interactive display so that a portion of each of at least some of the plurality of displayed objects is displayed at the edge of the interactive display after being moved as if each of the at least some of the plurality of displayed objects were extending past the edge of the interactive display.

11. A computer program product comprising one or more physical computer-readable media having stored thereon computer-executable instructions that, when executed by one or more processors of a computing system, cause the computing system to perform the following upon detecting that a gesture has been made on an interactive display associated with the computing system:

in response to detection of the gesture, an act of identifying a portion of each of at least some of a plurality of displayed objects to keep in display, the identified portion being less than the whole of each of the at least some of the plurality of displayed objects;

an act of moving the plurality of displayed objects to positions at the edge of the interactive display and rotating the at least some of the plurality of displayed objects so that only the identified portion of each of at least some of the plurality of displayed objects is displayed at the edge of the interactive display after being moved as if each of the at least some of the plurality of displayed objects were extending past the edge of the interactive display;

upon detecting a second gesture that has been made on the interactive display, an act of determining that the second gesture is associated with a first moved displayed object; and an act of dragging the first displayed object further into view including rotating and resizing the displayed object towards the direction of its original rotation and size as existed before the first displayed object was moved to the edge of the interactive display at the end of the act of dragging, an act of determining whether the first displayed object has been dragged to a threshold position on the interactive display;

if the first displayed object has been dragged at least to the threshold position, an act of positioning first displayed object at the location of the end of the act of dragging;

if the first displayed object has not been dragged at least to the threshold position, an act of snapping the first displayed object back to the edge of the interactive display.

12. The computer program product in accordance with claim 11, wherein the gesture is a wave gesture.

13. The computer program product in accordance with claim 12, wherein the wave gesture includes at least two major segments.

14. The computer program product in accordance with claim 12, wherein the wave gesture is made with respect to a portion of the interactive display, wherein the plurality of the displayed objects are related to the portion of the interactive display.

15. The computer program product in accordance with claim 12, wherein the plurality of displayed objects are all of the display objects on the interactive display.

* * * * *

UNITED STATES PATENT AND TRADEMARK OFFICE
CERTIFICATE OF CORRECTION

| | | |
|---|---|---|
| PATENT NO. | : 7,979,809 B2 | Page 1 of 1 |
| APPLICATION NO. | : 11/747836 | |
| DATED | : July 12, 2011 | |
| INVENTOR(S) | : Derek E. Sunday | |

It is certified that error appears in the above-identified patent and that said Letters Patent is hereby corrected as shown below:

In column 12, line 13, in Claim 11, delete "display" and insert -- display; --, therefor.

In column 12, line 18, in Claim 11, delete "positioning" and insert -- positioning the --, therefor.

In column 12, line 19, in Claim 11, after "dragging;" insert -- and --.

Signed and Sealed this
Sixteenth Day of August, 2011

David J. Kappos
*Director of the United States Patent and Trademark Office*